Figure 6:
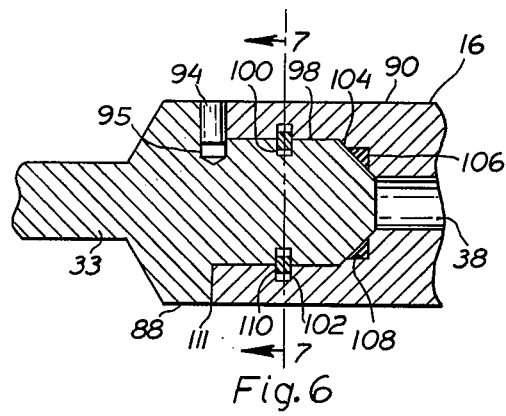

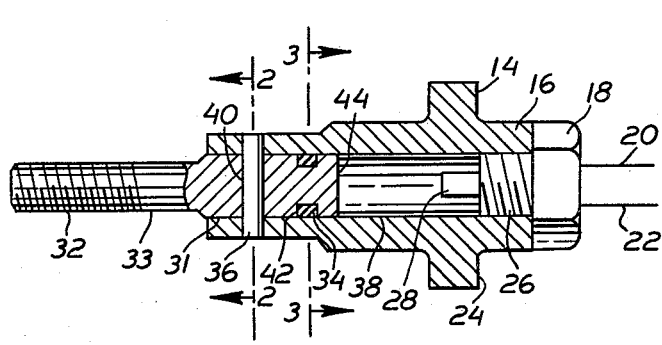

INVENTOR.
CLARENCE K. BROWN
AGENT

United States Patent Office 3,109,216
Patented Nov. 5, 1963

3,109,216
EXPLOSIVELY SEPARABLE BOLT AND CLAMP
Clarence K. Brown, Bellflower, Calif., assignor to Hi-Shear Corporation, Torrance, Calif., a corporation of California
Filed Dec. 29, 1960, Ser. No. 79,396
4 Claims. (Cl. 24—279)

This invention relates to a fastener and associated clamping devices which may be explosively separated.

This application is a continuation-in-part of the applicants prior co-pending application Serial No. 47,415, filed August 4, 1960.

An object of this invention is to provide a fastener that may be used to apply tensile forces in a clamping member with the ability to align itself in the direction required for the application of the force and with the capability of withstanding the tensile loads required in such a clamp and of resisting the necessary installation torque, yet this fastener to be capable of being separated by a relatively small charge of solid propellant material which may be detonated from a remote point by an electrical signal.

A further object of this invention is to provide an explosively separable bolt which incorporates trunnion bearing surfaces on its shank to permit the bolt to align itself in the direction of application of tensile force when used in assembly with a clamping device.

A further object of this invention is to provide an explosive bolt which may be installed in an unarmed condition and which may be armed or disarmed for safety at any time.

Conventional explosive bolts have been made in the past but have always contained an explosive charge buried in a recess within the shank. The structure of the bolt had to be weakened to provide for fracture due to the explosive detonation. However, the bolt structure could not be weakened beyond a point where the useful strength of the bolt would be excessively impaired, so a relatively large explosive charge was required to separate the bolt. This excessive explosive energy could do damage to adjacent structure. Moreover, this type of bolt would have to be installed in an armed condition without the capability of being disarmed.

According to this invention a separable bolt is made in two primary sections, one having a threaded end and the other a cylindrical body having diametrally opposed radially extending cylindrical trunnion bearing surfaces. The threaded end section has a reduced diameter which fits a longitudinal bore in the trunnion body member. A third member is employed to retain the reduced diameter of the threaded section of the bolt within the trunnion section. The longitudinal bore of the trunnion body member is adapted at the head to receive a conventional explosive squib. The retaining member is of a size and form which will fail in shear upon detonation of the squib.

According to a preferred but optional feature of the invention sealing means may be provided between the threaded section and the trunnion body section of the bolt to confine the explosive detonation of the squib and direct its full energy to separating the bolt.

Another object of this invention is to provide positive opening of the clamp member by utilising a portion of the residual force of the explosive separation of the fastener.

Figure 7:
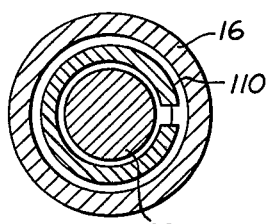
Figure 8:
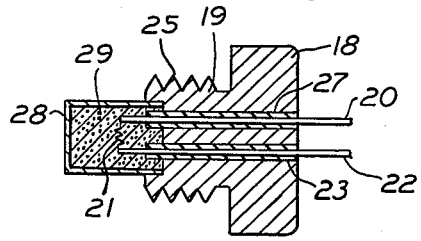
Figure 9:
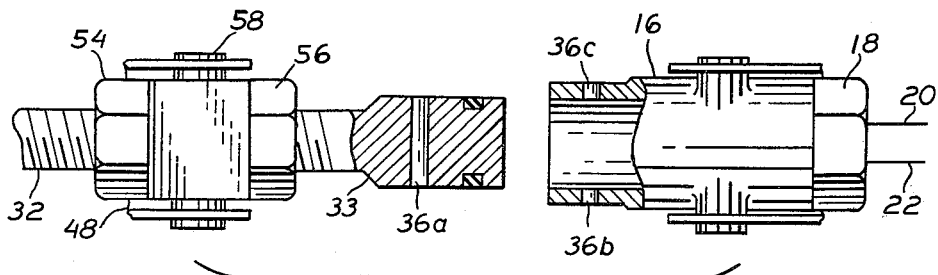

The above and other features of this invention will be fully understood from the following detailed description and the accompanying drawings, of which:

FIG. 1 is a side elevation of one embodiment of the invention;

FIG. 2 is a cross-section at line 2—2 of FIG. 1;
FIG. 3 is a cross-section at line 3—3 of FIG. 1;
FIG. 4 is a side elevation of the embodiment of the invention in FIG. 1 shown in assembly with a typical clamp member and associated parts;
FIG. 5 is a plan view of the trunnion bolt assembly of FIG. 4;
FIG. 6 is a fragmentary cross-section of an alternate embodiment of the invention shown in FIG. 1;
FIG. 7 is a cross-section taken at line 7—7 of FIG. 6;
FIG. 8 is a cross-section of a typical squib which may be used with the various embodiments of the invention;
FIG. 9 is a plan view of FIG. 4 after explosive separation.

In FIG. 1 there is shown a preferred embodiment of this invention. The fastener is shown with two primary sections, a threaded piston-like member 33 and a trunnion body member 16. The threaded member 33 is cylindrical in shape with a thread 32 and a smooth cylindrical shank 31. The trunnion body member 16 is of essentially cylindrical shape with cylindrical trunnion bearing surfaces 14 and 24 extending radially outward and diametrally opposed on trunnion body member 16 and conveniently disposed toward one end of the body member. A longitudinal bore 38 with axis perpendicular to the axis of the trunnion bearings 14 and 24, goes through the entire body member 16 and is threaded at the trunnion end to receive a conventional squib 18. A squib 18 conventionally has an explosive chamber 28 and electrical leads 20 and 22 which may be attached to a source of electric current.

A typical squib 18 is shown in FIG. 8. The squib body 19 has a thread 25 adapted to fit the device on which it is to be applied; in the present instance the threaded portion 26 of the longitudinal bore 38 of the trunnion body member 16 of FIG. 1. An explosive chamber 28 is filled with explosive 29. Electrical leads 20 and 22 are separated by insulation 23 and 27 from squib 18. A resistance bridge wire 21 connects the leads 20 and 22. Explosive chamber 28 filled with explosive 29 is assembled to the squib body 19 so that the explosive is held in contact with bridge wire 21. Electricity can be passed through bridge wire 21 to cause rapid heating and detonation of the explosive.

In manufacturing this fastener, threaded member 33 is inserted into the bore 38 of trunnion body 16 and a transverse hole 40 is drilled through both members to accept a shear pin 36.

As a preferred but optional feature the shank 31 of thread end 33 may have an undercut 42 of a size to receive a sealing member 34. This sealing member prevents leakage of gaseous products of the explosive charge contained in the squib 18 upon detonation and concentrates the entire force of the explosion on the surface 44 of threaded member 33 to effect shear failure of the pin 36 thus separating the fastener. FIG. 4 shows the embodiment of FIG. 1 incorporated in a typical clamping device 48. The clamping device 48 consists of a flat band 60 formed into a circle with its free ends overlapping. Clevis members 50 and 52 may be conveniently fastened with rivets such as 53 and 55 toward the free end of the band 60. As may be seen in FIG. 5, the clevis members 50 and 52 have upstanding walls 66, 68, 70 and 72 which are provided with transverse holes 74, 76, 78 and 80. Trunnion member 58 which is shown in partial cross-section in FIG. 5 is equipped with trunnion bearing surfaces 82 and 84 which are mounted in holes 74 and 76 of clevis member 52. Trunnion member 58 has a longitudinal bore 83 which provides clearance over the major diameter of thread 32 of threaded member 33 of the trunnion bolt.

In FIG. 4 conventional nut 54 is torqued to apply the tensile load to the trunnion bolt thereby tightening clamp 48 around the structural member to be secured. Conventional squib 18 is shown assembled to the trunnion bolt body member 16 with electrical leads 20 and 22 connected to a detonating circuit which consists of a switch 46 and a source of electric power 47.

FIG. 9 shows the position of the elements of the trunnion bolt after explosive separation has occurred. Pin 36 has been sheared leaving a portion 36A in the threaded member of the trunnion bolt and portion 36B and 36C in the trunnion body member 16. Conventional nut 56 is used as an optional means of transferring a portion of the separation force of the trunnion bolt to the trunnion member 58 to provide for a positive disengagement of band clamp 48 by utilizing a portion of the excess energy of the explosive separation process.

In FIG. 6 there is shown another embodiment of the trunnion bolt of FIG. 1. In this embodiment the threaded member 33 has an enlarged shank diameter 88 which matches the body diameter 90 of trunnion body 16. A pin 94 is installed to prevent relative rotation between threaded member 33 and trunnion body member 16. The longitudinal bore 38 of trunnion body member 16 is enlarged to receive a reduced diameter 98 of threaded member 33. The reduced diameter is provided with an undercut of rectangular section 100. The enlarged bore 98 is provided with a groove 102 located to match the position of groove 100. There is a tapered face 104 which connects the enlarged bore 98 with the longitudinal bore 38 of the trunnion body member 16. In the tapered face 104 of the enlarged bore 98 there is a recess 106 which is of a shape and size to accept an elastomeric sealing member 108. Retaining member 110 is a split, resilient ring which engages groove 100 in threaded member 33 and groove 102 in trunnion body member 16. The retaining ring 110 is adapted to fail in shear in the same manner as the pin 36 of FIG. 1 upon application of an explosive force as illustrated in FIG. 9 and herein before described. To assemble the device sealing ring 108 must first be inserted into the recess 106. The retaining ring 110 must be compressed and inserted into groove 102. Groove 102 would be of sufficient depth to allow expansion of ring 110 as the tapered nose of threaded member 33 is pushed into the bore 98 of trunnion member 16, thereby expanding retainer 110 until it snaps into groove 100 of the threaded member 33. After assembly of threaded member 33 to the trunnion member 16, the hole 95 may be drilled at the parting line 111 at the body diameter of the two mating parts and transverse to the center line of the two parts and the pin 94 may be inserted to prevent relative rotation of threaded end 33 with the trunnion body 16 during the installation torquing of the nut. All other features of this embodiment are the same as shown in FIG. 1.

In use the trunnion bolt of FIG. 1 would be installed in a clamping device such as is illustrated in FIG. 4. The clamp would be placed around cylindrical structural members 49 and 51 to be retained. Nut 54 of FIG. 4 would be torqued until the desired clamping pressure is obtained. Nut 56 would then be tightened against trunnion member 58. After installation is complete squib 18 may be conveniently installed and the external electrical leads 20 and 22 may be connected to a source of electrical power. Upon completing the circuit the squib would detonate, separating the bolt. Excess explosive energy would be transmitted through nut 56 to trunnion member 58 and the reaction through trunnion body member 16 to aid in physically unclamping the structure.

This invention is not to be limited by the embodiment shown in the drawings and described in the description, but only in accordance with the scope of the appended claims.

I claim:

1. A clamp which comprises: a strap member, said strap member of resilient material, said strap member formed in a circle, said strap member having a first end and a second end adapted to overlap; a first clevis member; and a second clevis member; said first clevis member fixed to said first end of said strap, said second clevis member fixed to said second end of said strap; a trunnion bolt, said trunnion bolt swivelly mounted in said first clevis member with the axis of rotation parallel to the axis of said strap member, said trunnion bolt having a threaded member and a trunnion body member, said threaded member having a threaded end and a smooth shank, said trunnion body member having a bore extending through said member, said bore adapted to mount an explosive squib at one end, said bore adapted to receive said smooth shank portion of said first member at the end opposite said squib adaptation, said trunnion body member having a pair of trunnion bearings for engagement with said first clevis member, said trunnion bearings diametrally opposed and transverse to said bore; a retainer member adapted to retain said smooth shank portion of said threaded member within said bore of said trunnion body member, the retainer member being adapted to fail in shear upon application of an explosive force within said bore of said second member; a trunnion block member having a pair of trunnion bearings and a smooth bore transverse to said bearings adapted to permit passage of said threaded end of said threaded end of said trunnion bolt, said trunnion member swivelly mounted in said second clevis member with axis of rotation parallel to the axis of said strap member; a nut, said nut adapted to engage said threaded end of said first member to create tension load in said trunnion bolt reacting against said trunnion block member; a second nut, said second nut assembled to said threaded end of said first member adjacent said smooth shank to transmit residual explosive force of the explosive separation of said trunnion bolt to said trunnion block member, thus forcing apart said first end and said second end of said strap member.

2. Apparatus as described in claim 1 which includes sealing means between said reduced cylindrical end of said first member and said bore of said second member adapted to confine an explosive force within said bore for maximum explosive effect.

3. Apparatus as described in claim 1 which includes said retainer member in the form of a pin installed transversely to the longitudinal axis of said trunnion bolt through said body member and said shank of said threaded member which is contained within said body member.

4. Apparatus as described in claim 1 which includes said retainer member in the form of a ring installed in a transverse plane to the longitudinal axis of said trunnion bolt, said bore of said trunnion body member adapted to retain said ring, said smooth shank of said threaded member adapted to be held in said bore of said trunnion body member by said ring retainer member and key means between said trunnion body member and said threaded member to prevent relative rotation.

References Cited in the file of this patent

UNITED STATES PATENTS

| | | |
|---|---|---|
| 2,809,584 | Smith | Oct. 15, 1957 |
| 2,895,197 | Agne et al. | July 21, 1959 |
| 2,915,800 | Graef et al. | Dec. 8, 1959 |
| 2,916,985 | Beach | Dec. 15, 1959 |
| 2,940,151 | Skelly | June 14, 1960 |